March 19, 1929.   W. E. MENZIES   1,705,673
BATTERY CHARGING SYSTEM
Filed Jan. 22, 1924
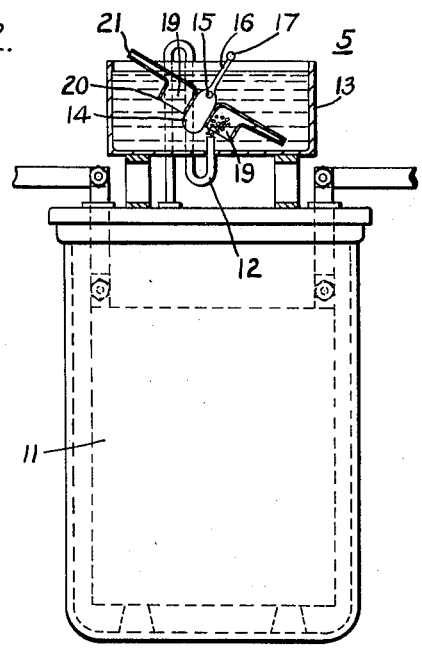
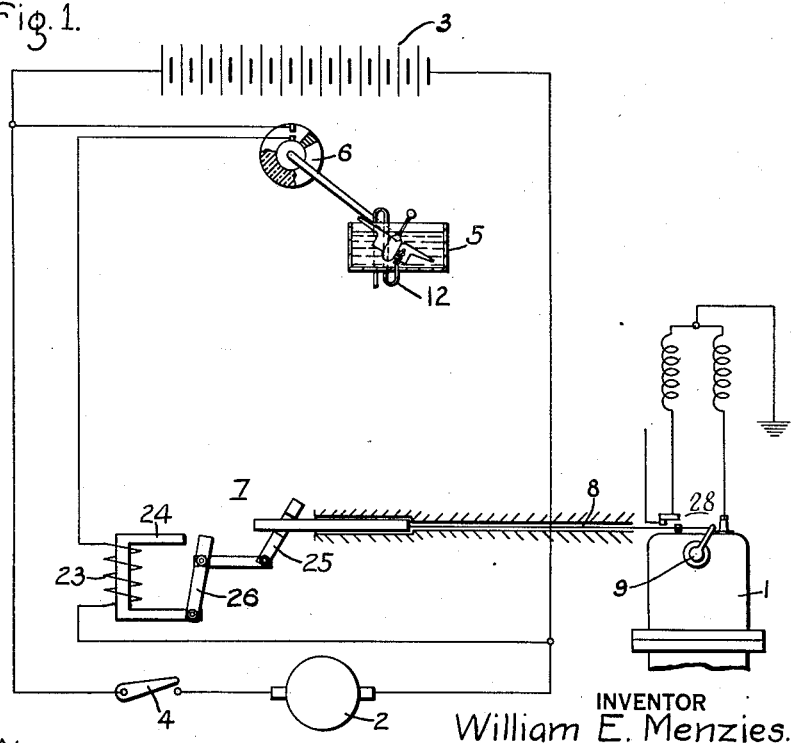
WITNESSES:
R. J. Butler.
J. R. Langley
INVENTOR
William E. Menzies.
BY
Wesley G. Carr
ATTORNEY Patented Mar. 19, 1929.

1,705,673

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

BATTERY-CHARGING SYSTEM.

Application filed January 22, 1924. Serial No. 687,716.

My invention relates to battery-charging systems, and it has particular relation to means whereby the charging of storage batteries may be automatically controlled in accordance with the degree of charge.

One object of my invention is to provide a battery-charging system wherein the rate of charging is varied automatically in accordance with the degree of charge.

A second object of my invention is to provide a battery-charging system wherein the gas evolved from the battery may be utilized as a measure of the degree of charge.

Another object of my invention is to provide a battery-charging system wherein the gas evolved may be measured by collecting only relatively small quantities thereof.

A further object of my invention is to provide a battery-charging system in which the rate of charging is automatically diminished as the battery approaches its fully charged condition to provide a tapering charge.

It has been proposed heretofore to collect the gas evolved from storage batteries during the charging operations but such systems have usually necessitated the employment of large gas bags or other containers whereby the charging operation has been controlled in accordance with the total quantity of gas collected. The employment of such systems has been attended with disadvantages that are obvious by reason of the relatively great volume of the gas-collecting devices. Such systems have usually operated also to merely terminate the charging operation upon the collection of a predetermined quantity of gas.

In accordance with the present invention, I provide a gas-measuring device that is preferably connected to a single unit or cell of the battery. A plurality of relatively small chambers or recesses are provided for collecting gas, and these alternately receive gas and discharge it therefrom, whereby the device is caused to oscillate. The movements of the oscillating device are employed to operate suitable mechanism for controlling the prime mover of the charging unit.

In the accompanying drawing,

Figure 1 is a diagrammatic view of circuits and apparatus embodying my invention; and Fig. 2 is a view, partially in elevation and partially in section, of a cell of a storage battery with my improved gas-measuring device in operative position relatively thereto.

Referring to Fig. 1, a battery-charging system comprises a prime mover 1, which may be, for example, an internal-combustion engine, and a generator 2, that may be operatively connected to the engine 1 in any suitable manner. A storage battery 3 is connected in circuit with the generator 2, the circuit being controlled by a suitable switch 4.

The operation of the engine 1 is controlled by a gas-measuring apparatus 5 that is operatively connected to a switch 6 for controlling the circuit of an electromagnetic ratchet device 7 that is mechanically connected, as by means of a Bowden wire 8, to the throttle valve 9 of the engine 1.

Reference may now be had to Fig. 2, in which the details of the gas-measuring device 5 are illustrated. A cell 11, which may be, for example, one of the cells of the storage battery 3 of Fig. 1, is connected, by means of a suitably curved pipe 12, to a tank 13 or other suitable liquid container in such manner that any gas evolved during the charging operation will bubble upwardly through the liquid in the tank, but the liquid is prevented from flowing into the battery.

A gas-measuring device that is submerged in the liquid within the tank comprises a member 14 that is pivotally mounted at 15 and is provided with an upwardly-extending arm 16 having a weighted portion 17, whereby the member 14 is in unstable equilibrium and tends to remain in the one or the other of its off-center positions. The gas-measuring device comprises, also, two containers 19 that are mounted upon opposite sides of the member 14, and each of which consists of a main body portion 20 that is open at its lower side and is provided with a tubular portion 21 that is open at its outer end.

The operation of the gas-measuring device will now be described. When gas is evolved from the electrolyte of the cell 11, it passes through the pipe 12 into the liquid of the tank 13. Inasmuch as the pivotally mounted member 14 is supported directly above the opening of the pipe 12 and it normally occupies either its illustrated position or the corresponding position at the other extremity of its path of movement, the one or the other of the chambers 19 is presented for the reception of gas.

It may be assumed that the member 14 is in the position in which it is illustrated and that gas is collected at a rate depending upon the rate of charging of the battery. When the right-hand container 19 contains a predetermined quantity of gas, the buoyancy of the latter is sufficient to oscillate the member 14 about its pivotal support and to present the other chamber 19 for the reception of gas. The outer end of the tubular portion 21 of the right-hand container 19 is now above the surface of the liquid and the pressure of the latter causes the gas to be quickly discharged therefrom. The oscillation of the member 14 continues in the manner just described at a rate corresponding to the rate of charging the battery.

The operation of the system of Fig. 1 is as follows: It may be assumed that the charging of the battery has proceeded to such stage that gas is evolved therefrom. The gas-measuring device 5, accordingly, oscillates in the manner previously described to operate the rotary switch 6 to intermittently close and open the circuit of the actuating coil 23 of an electromagnet 24. A ratchet 25 that is operatively connected to the armature 26 of the electromagnet 24, gradually actuates the Bowden wire to the left, as viewed in the drawing, to correspondingly close the throttle 9 of the engine 1.

The speed of the engine 1 and, accordingly, that of the generator 2 diminish with the closing of the throttle 9, and the rate of charging the battery diminishes correspondingly. Gas is evolved from the battery, however, at a substantially uniform rate in view of the well-known characteristic of storage batteries to evolve increasing quantities of gas as the charging operation nears completion, when charged at a substantially uniform rate. The result is to terminate the charging operation gradually and thereby secure what is known as a tapered charge.

It will be appreciated that it is not advisable to unduly prolong the charging operation, that is, after the speed of the engine has been reduced to a predetermined value. Accordingly, any of the usual arrangements for opening the ignition circuit may be operatively connected to the Bowden wire 8 to stop the engine at any desired point in the path of movement of the Bowden wire. A switch 28, controlled by the Bowden wire 8, is shown by way of example.

The advantages of employing a system of the above-described character for controlling the charging of the storage battery are that the charging operation is peculiarly adapted to the characteristics of the battery. The input of the battery during the latter stages of the charging operation is such that the latter is maintained at the gassing point regardless of the temperature condition of the generator or of the battery and its connections. This manner of charging insures that the battery is charged at the maximum safe rate without undue heating or loss of electrolyte.

To render the system operative for a succeeding operation, it is only necessary to reset the ratchet mechanism 7, the throttle and the switch 28.

It is understood that various modifications will occur to those skilled in the art to which my invention appertains and that no limitations are to be imposed upon the scope of my invention, except such as are necessitated by the prior art or are indicated in the appended claims.

I claim as my invention:—

1. In a battery-charging system, a gas-measuring device comprising means for generating gas, an outlet port for the generated gas, an oscillatable member adjacent to said port having recesses that alternately receive gas to actuate said member and then discharge the gas therefrom, and means whereby the generation of gas is controlled by the oscillation of said member.

2. The method of controlling the charging of a storage battery which consists in collecting the gas generated therein and intermittently discharging the gas and controlling the operation of a prime mover in accordance with the number of gas-collecting operations.

3. The method of controlling the charging of a storage battery which consists in measuring the gas evolved therefrom by retaining relatively small quantities of it temporarily and then terminating the charging operation upon the collecting of a predetermined number of such quantities.

4. The method of controlling the charging of a storage battery which comprises the collecting of gases generated and controlling the operation of a prime mover in accordance with the volume of gases collected.

5. In a battery charging system, means for discharging the gases, a liquid seal for the discharge means, and means for controlling the charging operation disposed for operation by the gases discharged.

6. In a battery charging system, means for discharging the gases generated, a liquid seal for the discharge means, and means for controlling the charging operations immersed in the liquid seal and disposed for operation by the gases discharged.

7. In a battery-charging system comprising a battery, means for charging the battery, an outlet for gases evolved from the battery, a plurality of receptacles for receiving and discharging the gas evolved alternately, and means for controlling the charging means actuated by the receptacles in accordance with the volume of gas evolved.

8. In a battery-charging system comprising a battery, means for charging the battery, an outlet port for gases generated in said battery, a pivotally mounted member having a recess on each side of its pivotal support, means for conducting the gases to said recesses, fluid means cooperating with said recesses for causing the gases to be received and discharged alternately therefrom whereby said member is caused to oscillate about its pivotal support, and means for controlling the charging means responsive to the oscillation of said pivotally mounted member.

In testimony whereof, I have hereunto subscribed my name this 3rd day of January, 1924.

WILLIAM E. MENZIES.